J. H. DICKINSON.
SHEAVE BLOCK.
APPLICATION FILED JAN. 16, 1917.
1,368,390.
Patented Feb. 15, 1921.
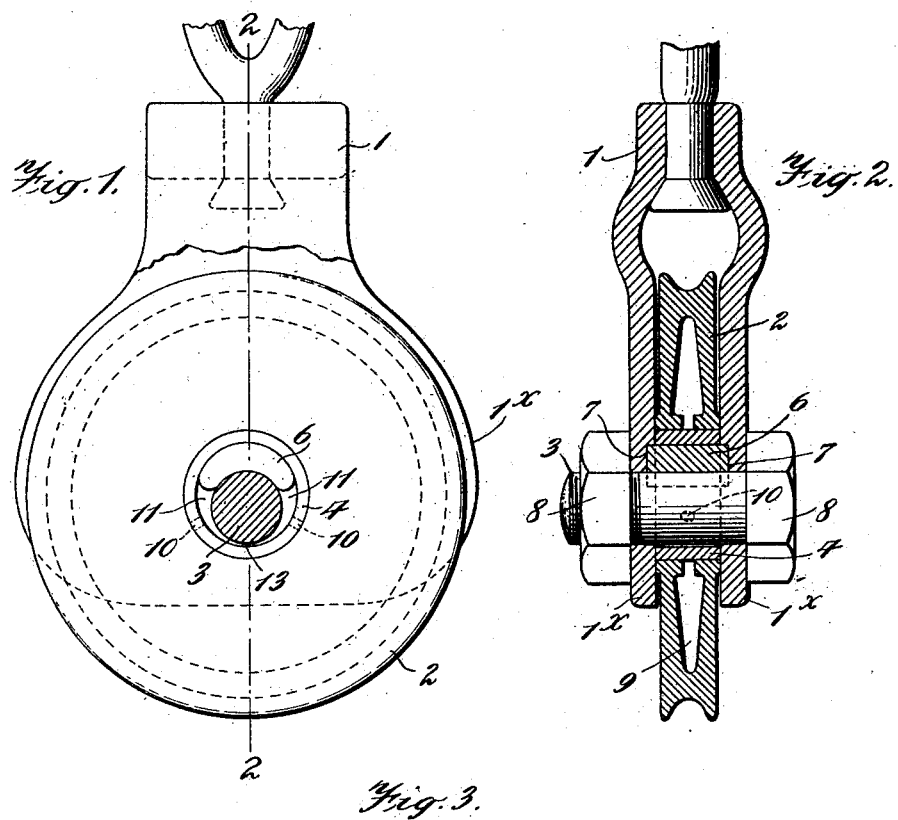
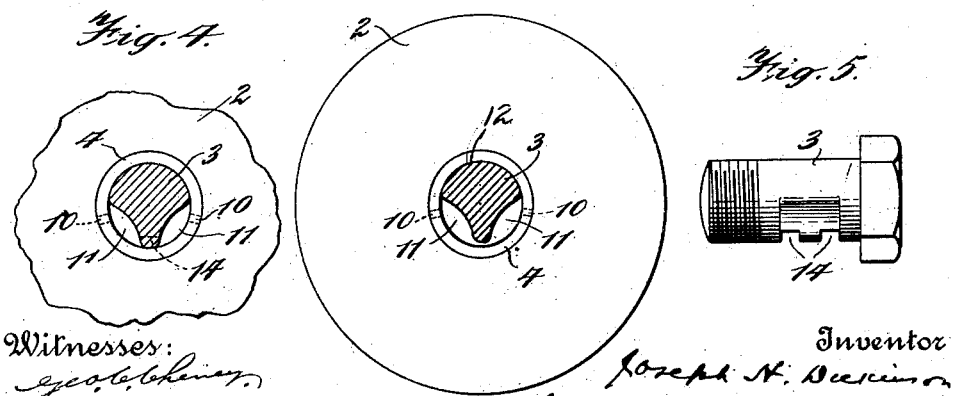

UNITED STATES PATENT OFFICE.

JOSEPH H. DICKINSON, OF MONTCLAIR, NEW JERSEY, ASSIGNOR TO LIDGERWOOD MANUFACTURING COMPANY, OF NEW YORK, N. Y., A CORPORATION OF NEW YORK.

SHEAVE-BLOCK.

1,368,390.

Specification of Letters Patent.

Patented Feb. 15, 1921.

Application filed January 16, 1917. Serial No. 142,603.

*To all whom it may concern:*

Be it known that I, JOSEPH H. DICKINSON, a citizen of the United States, and a resident of Montclair, in the county of Essex and State of New Jersey, have invented certain new and useful Improvements in Sheave-Blocks, of which the following is a specification.

This invention relates to improvements in sheave-blocks, and the invention has for its object the provision of an improved bearing for such sheave or carrier.

The improvements will be understood by reference to the accompanying drawings, in which:

Figure 1 is a view in elevation, partly in section, of one embodiment of the improvements, and Fig. 2 is a sectional view of the same on the line 2—2 of Fig. 1. Fig. 3 is a view in elevation of a modified form of the improvements. Figs. 4 and 5 show further modifications.

In the drawings I have illustrated two embodiments of the invention as applied to a sheave-block. In the prior art constructions of sheave-blocks it has been usual to provide the sheave with a circular bearing aperture which receives a cylindrical bearing pin necessarily of smaller diameter than the diameter of said aperture, in which case the bearing surface of the pin has a narrow line of contact with the inner cylindrical bearing surface of said aperture, said inner cylindrical surface being tangential to the cylindrical surface of the pin. This results in a narrow line of contact between the inner surface of the aperture and the surface of the bearing pin which results in great pressure along a narrow line of contact between the bearing aperture and the pin, the pressure along this line being frequently so great as to form a barrier against the passage of an adequate film of lubricant, the lubricant being scraped off the wall of the bearing aperture, thereby preventing adequate distribution of lubricant between the contacting bearing surfaces and resulting in excessive wear.

In the present improvements, the bearing element, for example a pin, is of substantially less cross-section than the diameter of the bearing aperture in the sheave but adequate lubrication is assured and excessive wear is prevented by providing a bearing surface on the bearing element, formed on a curve equal to the curve of the wall of the said bearing aperture. Or, in other words, the bearing surface of the bearing element, is formed on the arc of a segment having a radius coextensive with, or substantially coextensive with, the radius of the said bearing aperture of the wheel. The extended bearing surface so distributes the pressure between the sheave and its bearing element that adequate lubrication will be maintained.

In order to permit the entrance of the bearing member into the opening in the sleeve of the pulley, the length of the arcuate bearing surface on said member is made less than a semi-circle, and the overall dimensions of said member as regards a cross section thereof, as viewed in Fig. 3, are less than the diameter of said aperture, whereby I am enabled to form said surface on the same radius as that of the inner surface of said sleeve, and to arrange said surfaces so that they are in parallelism and in surface contact throughout.

In Figs. 1 and 2 the bearing surface of the wheel is the inner wall of bushing 4, and a pin 3 is shown in position within the bushing. It will be seen that the pin is of substantially less diameter than the bushing aperture, but that the pull of the sheave and its load is not thrown upon a narrow line of contact with the pin, but is distributed over the wide area of the upper surface of a bearing block 6, which in turn is supported upon the pin 3. The bearing block projects beyond the sides of the wheel, as shown in Fig. 2, and each projecting end of the block is disposed within a socket 7 formed in a side plate 1ˣ of the frame 1 of the sheave block to act as a spacer for the side plates of the sheave block against displacement. The pin has a head at one end and may be threaded at the opposite end to receive the nut 8 which head and nut contact with the side plates 1ˣ and hold the pin against displacement.

In the form of the invention shown in

Figs. 1 and 2 the inner surface of the sheave or wheel aperture itself will not contact directly with the pin and the latter does not constitute of itself the bearing for the sheave, said pin acting only as a support for the bearing element 6 and to hold the side plates of the block in proper position.

The sheave wheel may be formed with an internal chamber 9 disposed circumferentially of the bushing 4 and adapted to contain a supply of lubricant. In such case the bushing may be formed with a series of apertures 10, placed in register with the chamber 9 and through which lubricant may pass to the lubricant pockets 11 intermediate the pin and the bushing 4. Thus an adequate supply of lubricant may be maintained within the bushing 4, to be distributed about the inner wall thereof, and to form a constant film intermediate the bushing and the bearing member about which the wheel rotates.

It will be understood that various modifications may be made in the form of the improvements without departing from the spirit of the invention. For instance, a pin may be employed which is formed with an integral face, 12 in the arc of a segment having a radius equal to the radius of the bearing aperture, and a cross-section of the pin may be substantially less than the diameter of the aperture, as shown in Fig. 3.

In the form shown in Figs. 1 and 2 the parts are so proportioned that the lower surface of the pin 3 closely approaches the lowermost portion of the inner surface of the bushing 4, as indicated at 13, and in Fig. 3 the lowermost portion of the pin has a similar position, so that movement of the sheave transversely of the pin is prevented.

As shown in Figs. 4 and 5 of the drawings I may provide the lower portion of the pin 3 when tightly fitted in the bushing 4 with one or more transverse passages 14 to permit the lubricant to pass freely to and from the spaces in the bushing on opposite sides of the pin.

What I claim and desire to secure by Letters Patent of the United States is:—

1. In a sheave-block, a sheave having a cylindrical bearing aperture and a bearing member located in said aperture, the said member having a bearing surface formed on an arc having a radius the same as the radius of the bearing aperture.

2. In a sheave-block, a sheave having a cylindrical bearing aperture, a member located in said aperture, the diameter of the member being substantially less than that of the aperture, and a bearing block intermediate the said member and the wall of said aperture, the surface of the block contacting with the wall being formed on an arc having a radius the same as the radius of the said bearing aperture.

3. In a sheave-block, a wheel having a bearing aperture, a bearing pin located in said aperture, a block frame comprising side plates embracing the wheel and formed with apertures to receive the pin, and a bearing block intermediate the pin and the wheel and having its ends seated within sockets formed in the side plates, the upper surface of the block being formed on an arc having a radius equal to the radius of the bearing aperture of the wheel.

4. In a sheave-block, a sheave having a cylindrical bearing aperture, a member located in said aperture, the diameter of the member being substantially less than that of the aperture, and a segmental bearing block intermediate the said member and the wall of said aperture, the surface of the block contacting with the wall being formed on an arc having a radius the same as the radius of the said bearing aperture.

5. In a sheave-block, a sheave having a cylindrical bearing aperture, a member located in said aperture, the diameter of the member being substantially less than that of the aperture, and a segmental bearing block supported in the frame of the sheave intermediate the said member and the wall of said aperture, the surface of the block contacting with the wall being formed on an arc having a radius the same as the radius of the said bearing aperture.

6. In a sheave-block, a sheave having a cylindrical bearing aperture, a member located in said aperture, the diameter of the member being substantially less than that of the aperture, and a segmental bearing block disposed in the upper portion of the bearing aperture and supported in the frame of the sheave, said bearing block being intermediate said member and the wall of said aperture, the surface of the block contacting with the wall being formed on an arc having a radius the same as the radius of the said bearing aperture.

7. In a sheave-block, a sheave having a cylindrical bearing aperture and a bearing member located in said aperture, the said member having a bearing surface formed on an arc having a radius the same as the radius of the bearing aperture, the overall dimensions of said member being less than the diameter of the aperture in said sheave.

8. In a sheave-block, a sheave having a cylindrical bearing aperture and a bearing member located in said aperture, the said member having a bearing surface formed on an arc having a radius the same as the radius of the bearing aperture, the curved bearing portion of said member being comprised within less than a semi-circle.

9. In a sheave-block, a sheave having a cylindrical bearing aperture and a bearing member located in said aperture, the said member having a bearing surface formed on an arc having a radius the same as the radius of the bearing aperture, the greatest dimension of said member being less than the diameter of the bearing aperture in the sheave.

In testimony whereof I have hereunto signed my name in the presence of two subscribing witnesses.

JOSEPH H. DICKINSON.

Witnesses:
W. LEE HELMS,
PAUL H. FRANKE.